(12) United States Patent
Osgood

(10) Patent No.: US 6,233,138 B1
(45) Date of Patent: May 15, 2001

(54) TELESCOPING PIVOT HINGE FOR COMPUTER DISPLAY

(75) Inventor: Alan George Osgood, Redmond, WA (US)

(73) Assignee: Evergreen Innovations, L.L.C., Carnation, WA (US)

( * ) Notice: Subject to any disclaimer, the term of this patent is extended or adjusted under 35 U.S.C. 154(b) by 0 days.

(21) Appl. No.: 09/353,902

(22) Filed: Jul. 16, 1999

(51) Int. Cl.$^7$ .............................. H05K 7/16; H05K 5/00; G06F 1/16
(52) U.S. Cl. ..................... 361/681; 361/682; 361/683; 364/708.1; 248/920
(58) Field of Search ................................. 361/681, 682, 361/683; 348/794; 364/708.1; 248/917, 919, 920, 921, 922, 923, 157, 161, 420, 346.03, 346.04; 349/58; 312/223.2

(56) References Cited

U.S. PATENT DOCUMENTS

| | | | |
|---|---|---|---|
| 4,859,092 | * | 8/1989 | Makita ................................. 400/83 |
| 5,165,145 | * | 11/1992 | Sherman .............................. 16/341 |
| 5,168,426 | * | 12/1992 | Hoving et al. ...................... 361/392 |
| 5,205,017 | * | 4/1993 | Wang .................................... 16/367 |
| 5,229,920 | * | 7/1993 | Spaniol et al. ...................... 361/393 |
| 5,255,214 | * | 10/1993 | Ma ..................................... 364/708.1 |
| 5,345,362 | * | 9/1994 | Winkler ............................... 361/681 |
| 5,494,447 | * | 2/1996 | Zaidan ................................ 439/31 |
| 5,548,478 | | 8/1996 | Kumar et al. . |
| 5,594,619 | * | 1/1997 | Miyagawa et al. .................. 361/681 |
| 5,629,832 | | 5/1997 | Sellers . |
| 5,658,063 | * | 8/1997 | Nasserbakht ........................ 353/122 |
| 5,668,570 | | 9/1997 | Ditzik . |
| 5,729,429 | * | 3/1998 | Margaritis et al. ................. 361/680 |
| 5,796,576 | | 8/1998 | Kim . |
| 5,805,415 | | 9/1998 | Tran et al. . |
| 5,815,735 | | 9/1998 | Baker . |
| 6,005,767 | * | 12/1999 | Ku et al. ............................. 361/681 |
| 6,008,983 | * | 12/1999 | Yen ..................................... 361/681 |
| 6,016,171 | * | 1/2000 | Tsao ................................... 348/836 |
| 6,076,786 | * | 6/2000 | Meyer ................................. 248/161 |

FOREIGN PATENT DOCUMENTS

| | | | |
|---|---|---|---|
| 3235457 | * | 3/1984 | (DE) ................................... 361/681 |
| 3-278212 | * | 12/1991 | (JP) .................................... 361/681 |
| 5-108203 | * | 4/1993 | (JP) .................................... 361/681 |
| 5-173668 | * | 7/1993 | (JP) .................................... 361/681 |
| 6-83479 | * | 3/1994 | (JP) .................................... 361/681 |
| 6-175750 | * | 6/1994 | (JP) .................................... 361/681 |
| 6-187068 | * | 7/1994 | (JP) .................................... 361/681 |

* cited by examiner

*Primary Examiner*—Leo P. Picard
*Assistant Examiner*—Anatoly Vortman

(57) ABSTRACT

A telescoping pivot hinge for a notebook computer or similar device provides an apparatus for the angle of inclination, the vertical elevation, and the horizontal distance of the visual display 38 to be adjusted relative to the input device 28. A first embodiment provides apparatus for adjusting the angle of inclination and the vertical elevation of the visual display 38 relative to the input device 28. A second embodiment provides apparatus for adjusting the angle of inclination, the vertical elevation and the horizontal distance of the visual display 38 relative to the input device 28. Input male member rod sections 54 telescopically engage input female member tunnels 62 on the input housing lower side 23 to provide apparatus for adjusting the horizontal distance between the display housing 31 and the input housing 21. Input male member rod sections 74 telescopically engage input female member tunnels 82 on the display housing back side 33 to provide apparatus for adjusting the vertical elevation between the display housing 31 and the input housing 21. Input male member pivot sections 72 rotationally engage input pivot sections 52 to provide apparatus for adjusting the angle of inclination between the display housing 31 and the input housing 21.

17 Claims, 7 Drawing Sheets

TELESCOPING PIVOT HINGE FOR COMPUTER DISPLAY

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

The Field of the Invention

The present invention relates to a hinge device for notebook computers and other devices which comprise a manual input device housing and a visual display housing. In particular it relates to a hinge mechanism that provides means to control the angle of inclination, the vertical height and the horizontal distance between the manual input device housing and the visual display housing.

The ideal vertical elevation for a computer visual display for most users is several inches above the ideal elevation of a manual input device such as a keyboard or touchpad. Also the ideal horizontal position of the visual display is several inches behind the ideal horizontal position for manual input devices. Traditional desktop computers have manual input devices (keyboard and mouse) that are physically separate from the visual displays. This allows a user to position both the manual input device and the visual display in an optimum position to reduce stress and avoid repetitive stress injuries.

Small portable computers, including notebook computers, are becoming ever more popular. Notebook computers typically comprise two housings connected by a hinge. The first housing contains the actual computer (processor, memory and storage devices, etc.). This housing normally contains manual input devices such as a keyboard and a cursor control device. The first housing is referred to as the input housing below. The second housing contains a flat panel visual display. The second housing is referred to as the display housing below. The back of the input housing and the lower side of the display housing are typically connected by a hinge. The hinge allows the angle of inclination between the input housing and the display housing to be varied. The prior art hinges link the lower side of the display housing to the back of the input housing. When the input housing is in a position for comfortable keyboarding and cursor control, the display housing is too low for comfortable viewing. When the display housing is in a position for comfortable viewing, the input housing is too high for comfortable use. This can lead to fatigue and repetitive stress injuries. The greater the usage time, the more likely for users to experience fatigue and repetitive stress injuries.

Initially notebook computers were used mainly as secondary portable computers to provide limited computing capability when users were away from their traditional desktop computer. Notebook computers have become increasingly more powerful and have increasing larger and more usable visual displays. There is a trend for users to replace desktop personal computers with notebook computers. The usage time for notebook computers is increasing substantially. Many users are in danger of incurring repetitive stress injuries from extensive use of notebook computers.

The prior art contains several attempts to allow the vertical elevation and horizontal distance of the notebook computer display housing to be adjusted relative to the elevation and distance of the input housing.

U.S. Pat. No. 5,796,576 to Kim discloses a detachable hinge for the display housing. No means are provided for supporting the display when it is detached from the input housing. This design only addresses the problem of exchanging displays on notebook computers. It does not address the problem of adjusting the vertical elevation and horizontal distance of the display housing relative to the input housing during operation of the computer.

U.S. Pat. No. 5,629,832 to Sellers discloses a portable computer with a keyboard that is moveable relative to the main processor housing. This design does not allow the display housing to be elevated enough relative to the keyboard to avoid fatigue and repetitive stress injuries.

U.S. Pat. No. 5,548,478 to Kumar et al. discloses an adjustable hinge for a portable computer. The hinge allows the display housing to be flipped over to serve as a touch pad input device. The hinge does not allow the display housing to be elevated relative to the input housing.

U.S. Pat. No. 5,668,570 to Ditzik discloses a small transportable computer with a display housing that can be adjusted in vertical elevation and horizontal distance relative to the input housing. The design comprises three housings (a main processor housing, an input housing, and a display housing). The hinge attaches the lower side of the display housing to the front of the main processor housing. This design is not readily adaptable to notebook computers.

U.S. Pat. No. 5,815,735 to Baker discloses a notebook computer display housing which is detachable from the input housing and a separate pivot arm display support. The display support requires the display housing to be detached from the input housing in order to adjust the vertical elevation and horizontal distance of the display housing relative to the input housing. The separate display support must be available at each location where a user wants to adjust the vertical elevation and horizontal distance of the display housing relative to the input housing. This requires the user to either transport the display support along with the notebook computer, or keep a support at each location where the computer is used.

U.S. Pat. No. 5,805,415 to Tran et al. discloses a detachable hinge and a separate support for the display housing. The hinge and support requires the display housing to be detached from the input housing in order to adjust the vertical elevation and horizontal distance of the display housing relative to the input housing. The separate support must be available at each location where a user wants to adjust the vertical elevation and horizontal distance of the display housing relative to the input housing. This requires the user to either transport the support along with the notebook computer, or keep a support at each location where the computer is used.

What is needed is a hinge system for a notebook computer, or similar device, that allows the angle of inclination, the vertical elevation and the horizontal distance of the display housing to be adjusted relative to the input housing without the use of a separate support.

BRIEF SUMMARY OF THE INVENTION

The present invention relates to a telescoping pivot hinge system for a notebook computer or similar electronic device that allows the angle of inclination and the vertical elevation of the visual display housing to be adjusted relative to the manual input device housing. An objective of the invention is to allow the angle of inclination and the vertical elevation of the display housing of a notebook computer to be adjusted relative to the input housing so that users can reduce fatigue and repetitive stress injuries. A first embodiment of the hinge system allows the angle of inclination and the vertical elevation of the display housing to be adjusted relative to the input housing. A second embodiment of the hinge system allows the angle of inclination, the vertical elevation, and the horizontal distance of the display housing to be adjusted relative to the input housing. Both the first and the second embodiments allow the users of notebook computers to adjust the vertical elevation of the display housing relative to the input housing without resorting to separate support devices for the display housing. This improves the portability of notebook computers that can reduce fatigue and repetitive stress injuries. Both the first and second embodiments allow the display housing to be separated from the input housing to allow additional flexibility in placement of the display housing and the input housing. Both the first and second embodiments may be added to existing notebook computers or integrated into the design of new computers.

Figure 1:
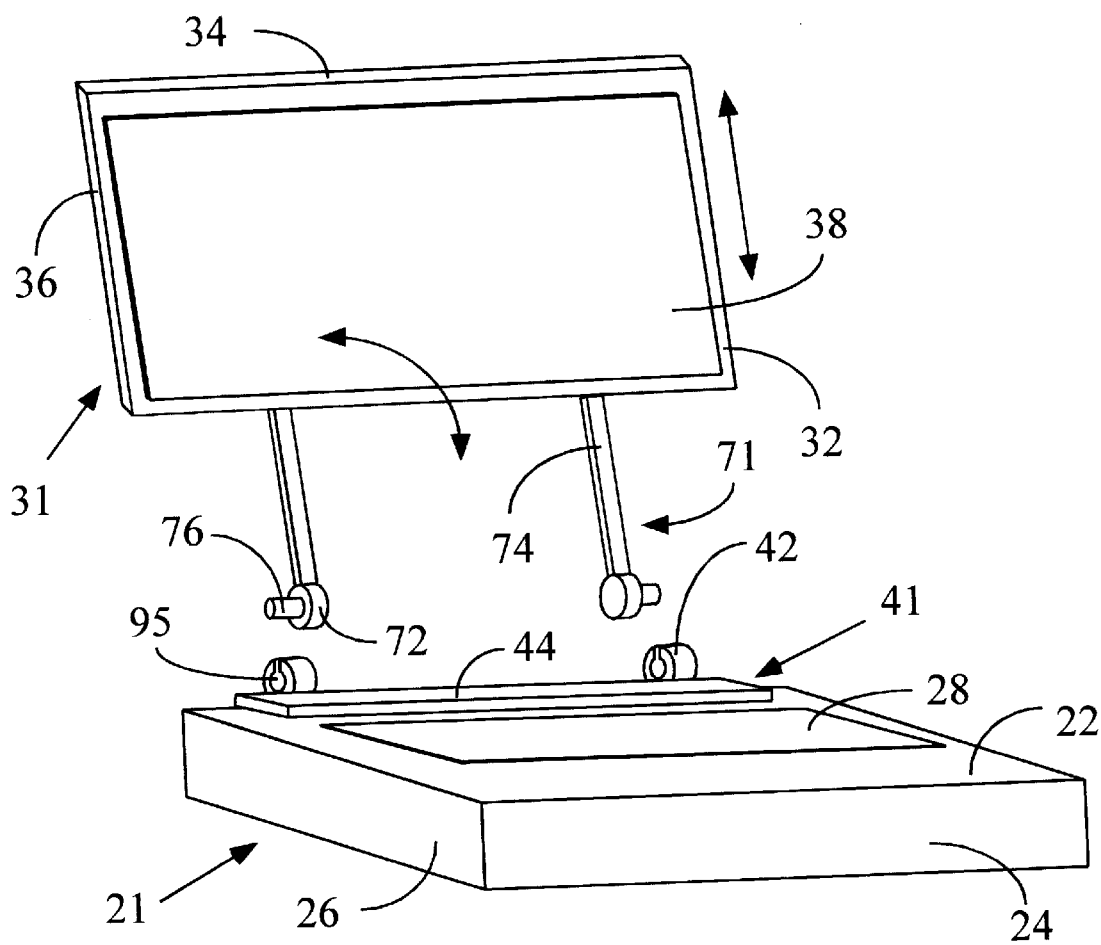
FIG. 1 shows an exploded view of the first embodiment.

REFERENCE NUMERALS IN FIGURES.

21—input housing
22—input housing upper side
23—input housing lower side
24—input housing front side
25—input housing back side
26—input housing left side
27—input housing right side
28—input device
31—display housing
32—display housing front side
33—display housing back side
34—display housing upper side
35—display housing lower side
36—display housing left side
37—display housing right side
38—visual display
41—hinge input unitary member
42—input unitary member pivot
44—input unitary member attachment plate
45—input unitary member mating surface
51—hinge input male member
52—input male member pivot
54—input male member rod
55—input male member rod foot
56—input male member rod horizontal leg
57—input male member rod vertical leg
61—hinge input female member
62—input female member tunnel
63—input female member mating surface
71—hinge display male member
72—display male member pivot
74—display male member rod
75—display male member rod notch
76—pivot pin
81—hinge display female member
82—display female member tunnel
83—display female member mating surface
84—display female member position keeper
91—pivot bolt
92—pivot bolt nut
93—pivot hole
94—screw
95—pivot slot
96—remote display support
97—remote support pivot
98—remote support rod

DETAILED DESCRIPTION OF THE INVENTION

Reference is now made to the drawings wherein like parts are designated with like numerals throughout. The present invention discloses a telescoping pivot hinge for notebook computers or other electronic devices that provides means for adjusting the angle of inclination, vertical height, and horizontal distance between the display housing and the input device housing. The telescoping pivot hinge disclosed here allows users of notebook computers to adjust the position of the visual display relative to the manual input devices so as to reduce fatigue and repetitive stress injuries. The telescoping pivot hinge may be added to existing notebook computers or integrated into the design of new computers.

Figure 2:
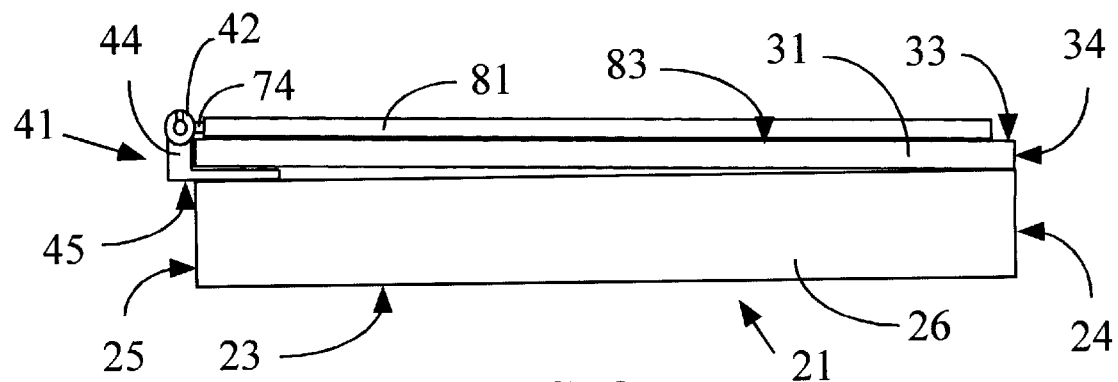
FIG. 2 shows a view towards the left side of the first embodiment with the display housing stored against the input housing.

FIG. 1 shows an isometric view of a notebook computer input housing 21 and display housing 31 with the basic version of the first embodiment of the present invention attached. The computer manual input device 28 is located on the input housing upper side 22. The visual display 38 is located on the display housing front side 32. The first embodiment comprises a hinge input unitary member 41, a hinge display female member 81, and a hinge display male member 71. The hinge input unitary member 41 attaches to the input housing upper side 22. FIG. 2 shows a view towards the left side of a notebook computer with the display housing 31 stored against the input housing 21. The display housing upper side 34 is flush with the input housing front side 24.

The hinge input unitary member 41, comprises an input unitary member pivot 42, and an input unitary member attachment plate 44. A pivot slot 95 penetrates the input unitary member pivot 42. The hinge input unitary member 41, is located on the input housing upper side 22 towards the input housing back side 25. The hinge input unitary member 41 is attached to the input housing upper side 22 by the input unitary member mating surface 45. Adhesive attaches the input unitary member mating surface 45 of the hinge input unitary member 41 to the input housing upper side 22. The pivot slot 95 engages with a pivot pin 76 on the hinge display female member pivot 72.

The hinge display female member 81, comprises a display female member tunnel 82 and a display female member mating surface 83. The hinge display female member 81, is located on the display housing back side 33 towards the display housing lower side 35. The hinge display female member 81 is attached to the display housing back side 33 by the input female member mating surface 83. Adhesive attaches the display female member mating surface 83 of the hinge display female member 81 to the display housing back side 33.

The hinge display male member 71, comprises a display male member pivot 72, and a display male member rod 74. A pivot pin 76 projects out the side of the display male member pivot 72. The pivot pin 76 is integral to the input male member pivot 72. The pivot pin 76 is inserted into the pivot slot 95 in the input unitary member pivot 42. The pivot pin 76 rotationally attaches the input unitary member pivot 42 to the display male member pivot 72. The axis of rotation between the input unitary member pivot 42 and the display male member pivot is perpendicular to the angle of inclination between the input housing upper side 22 and the housing front side 32. This provides means for rotating the angle of inclination of the display housing front side 32 relative to the input housing upper side 22. The angle of rotation between the display housing front side 32 and the input housing upper side 22 is maintained by friction between the pivot pin 72 and the pivot slot 95.

Figure 3:
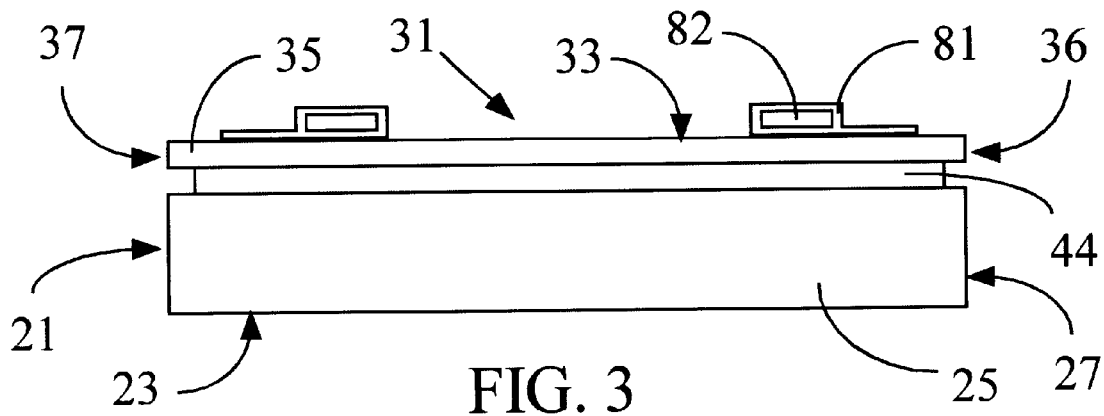
FIG. 3 shows the open end of the hinge display female member tunnels of the first embodiment.
Figure 4:
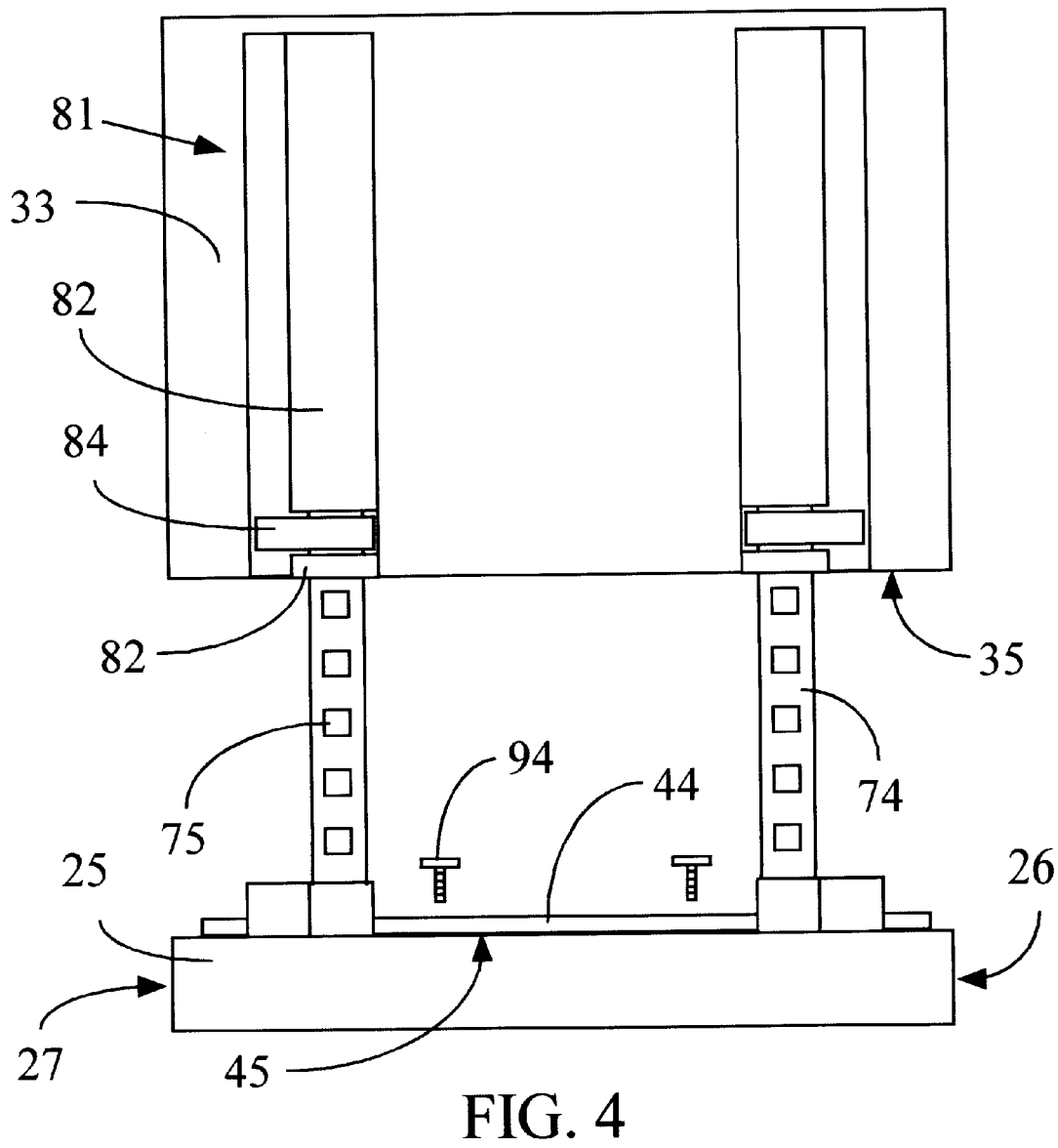
FIG. 4 shows a view towards the back side of the input housing and the display housing with the telescoping pivot hinge of the first embodiment extended vertically.

FIG. 3 shows a view towards the back side of a notebook computer with the display housing 31 stored against the input housing 21. The hinge display female member 81 is shown from the open end of the input female member tunnel 82. FIG. 4. Shows a view from the back side of a notebook computer with the display housing 31 rotated approximately 90 degrees from the storage position and elevated vertically from the storage position. The input male member rod 74 telescopically engages inside the input female member tunnel 82. This provides means for the display housing lower side 35 to be elevated relative to the input housing upper side 22. The hinge input unitary member 41 of the first embodiment is designed to attach to the input housing upper side 22 so as to not block access to the input housing front side 24, the input housing back side 25, the input housing left side 26, or the input housing right side 27. The hinge input unitary member 41 normally is attached to the input housing upper side 22 by adhesive on the input unitary member mating surface 45. Optional screws 94 may be inserted through the hinge input unitary member 41 into the input housing upper side 22.

The hinge display female member 81 is designed to attach to the display housing back side 33 so as to not project beyond either the display housing left side 36 or the display housing right side 37. This minimizes the overall width of the notebook when the display housing 31 is as wide or wider than the input housing 21. Attaching the hinge display female member 81 to the display housing back side 25 provides an unobstructed view of the visual display 38 on the display housing front side 32.

The elevation of the display housing lower side 35 relative to the input housing upper side 22 is normally controlled by friction between the input male member rod 74 and the input female member tunnel 82. FIG. 4 shows optional input female member position keepers 84 on the hinge display female members 81. An optional input female member position keeper 84 engages an input male member rod notch 75 to provide positive control of the elevation of the display housing lower side 35 relative to the input housing upper side 22.

Figure 5:
FIG. 5 shows the input member unitary pivot and the display male member pivot.

FIG. 5 shows the pivot slot 95 of the input unitary member pivot 42 and the pivot pin 76 of the display male member pivot 72. The pivot slot 95 comprises a circular section and a straight section. The diameter of the circular section is slightly smaller than the diameter of the pivot pin 76. The straight section of the pivot slot 95 allows for expansion of the circular section of the pivot slot 95. This allows the pivot slot 95 to accommodate a pivot pin 76. The pivot pin 76 is inserted into the pivot slot 95 to attach the display male member pivot 72 to the input unitary member pivot 42. The angle of rotation between the display housing 31 and the input housing 21 is maintained by friction between the pivot slot 95 and the pivot pin 76. Optional groves or serrations can be added to the contact surfaces of the pivot slot 95 and the pivot pin 76. This increases the friction between the pivots and helps to maintain the angle of inclination between the display housing 31 and the input housing 21.

Figure 6:
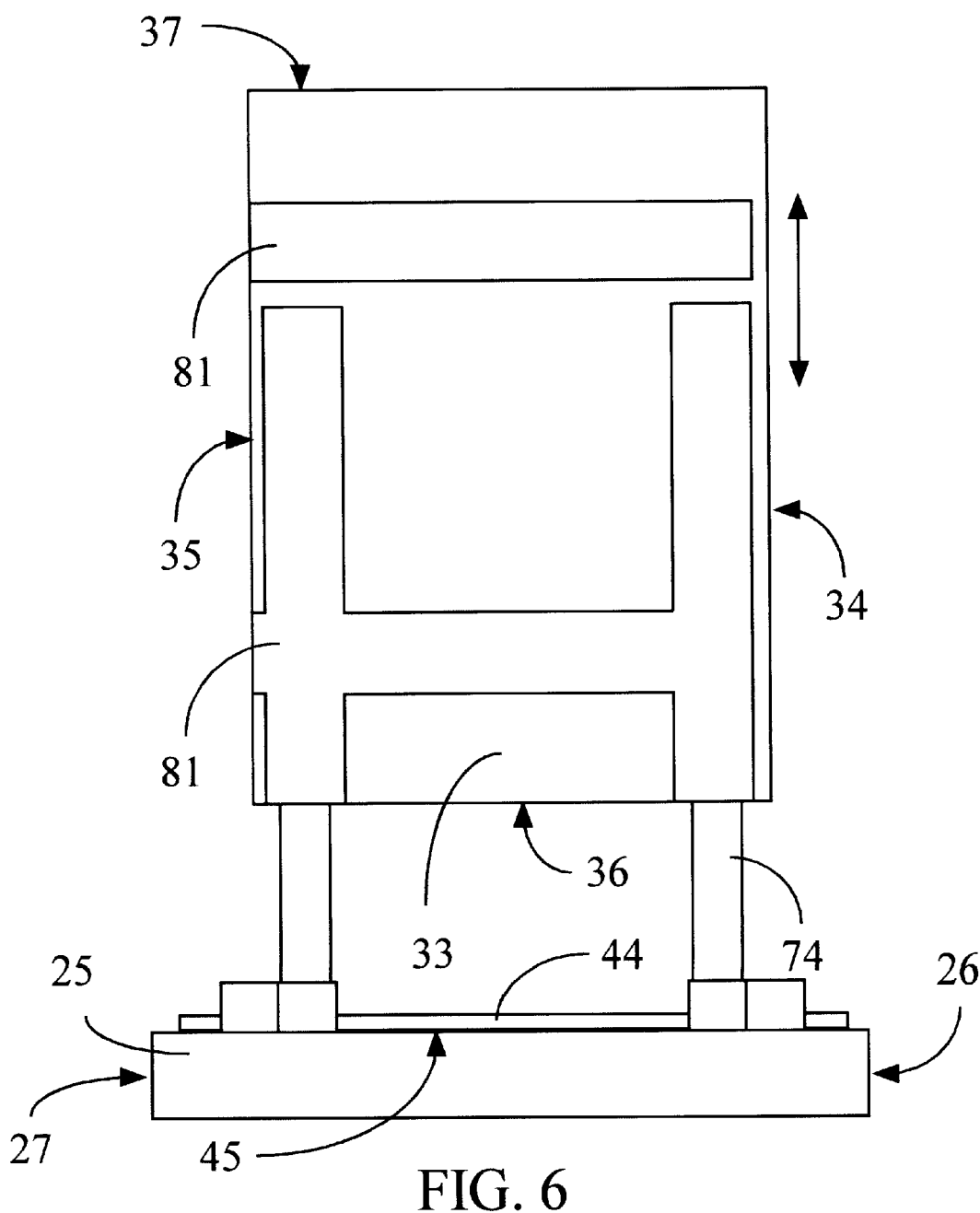
FIG. 6 shows a view towards the back side of the display housing with the display housing in a portrait orientation.

FIG. 6 shows a view towards the display housing back side 33 with the display housing rotated to a portrait orientation. The hinge display female members 81 comprise two sets of tunnels. The first set of tunnels are aligned perpendicular to the display housing lower side 35. This set of tunnels allows the display housing 31 to engage the input male member rod sections 74 with the visual display 38 in a landscape orientation. The second set of tunnels are aligned perpendicular to the display housing left side 36. This set of tunnels allows the display housing 31 to engage the input male member rod sections 74 with the visual display 38 in a portrait orientation.

Figure 7:
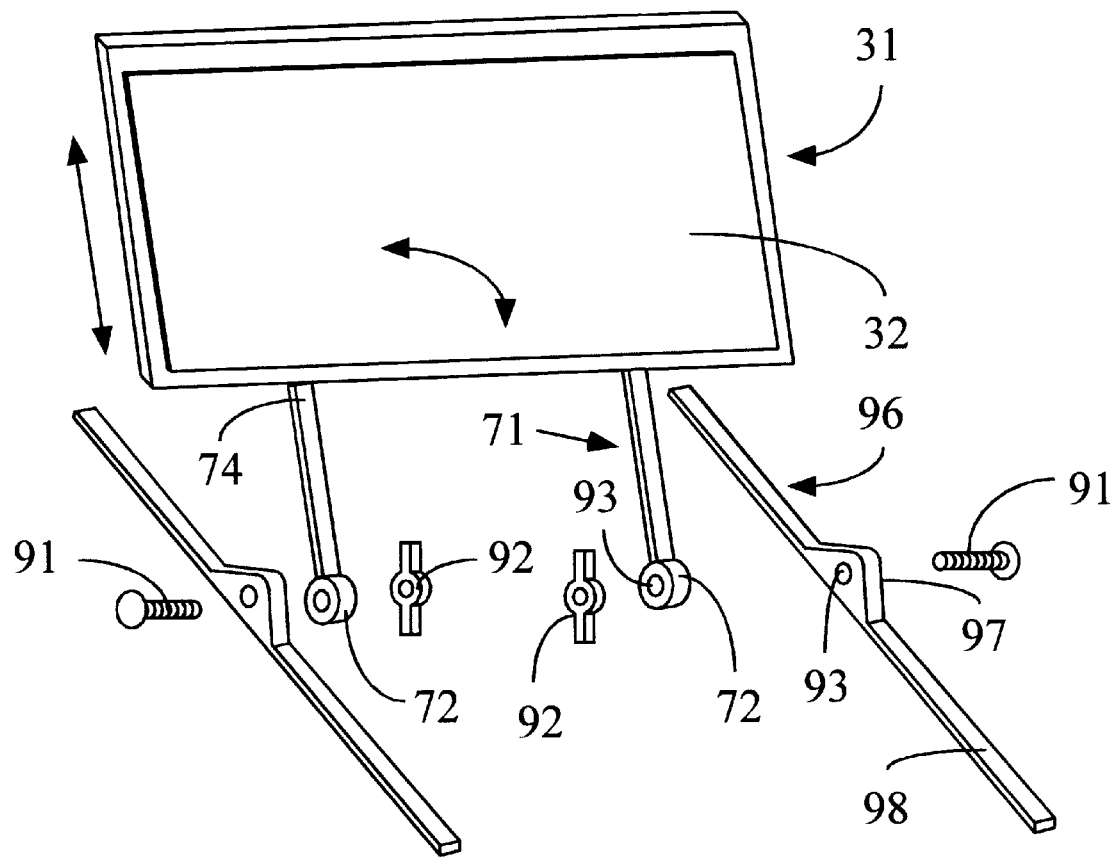
FIG. 7 shows an exploded view of the display housing engaged with the remote visual support.

FIG. 7 shows an optional remote display support 96. The remote display support 96 comprises a remote support pivot 97 and a remote support rod 98. The input male member pivot sections 72 rotationally attach to the remote support pivot sections 97. The remote support rod sections 98 may be placed on a horizontal surface. This allows the display housing 31 to be detached from the input housing 21. The input housing 21 can then be placed on one surface, such as a workstation keyboard shelf, and the display housing 31 can be placed on another surface such as a workstation writing surface. A pivot bolt 91 replaces the pivot pin 76 as shown in FIG. 1. A pivot hole 93 penetrates the display male member pivot 72. The pivot bolt 91 is inserted through the pivot holes 93 in the display male member pivot 72 and the remote visual display support pivot 97. A pivot bolt nut 92 holds the pivot bolt 91 in place. The pivot bolt 91 rotationally attaches the remote visual display support pivot 97 to the display male member pivot 72. This provides alternate means for maintaining the angle of inclination of the display housing 31 relative to the remote display support rod section 98. Optional groves or serrations can be added to the surface of the input male member pivot section 72 that contacts the remote support pivot 97. Optional groves or serrations can also be added to the surface of the remote support pivot that contacts the 97 input male member pivot section 72. This increases the friction between the pivots and helps to maintain the angle of inclination between the display housing 31 and the input housing 21.

Figure 8:
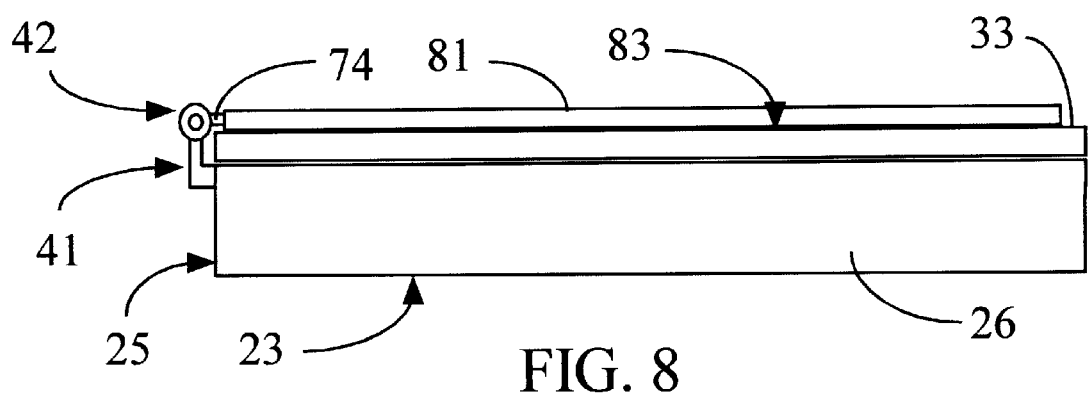
FIG. 8 shows a view of the first embodiment towards the right side of the input housing and the display housing with the display housing stored against the input housing.
Figure 9:
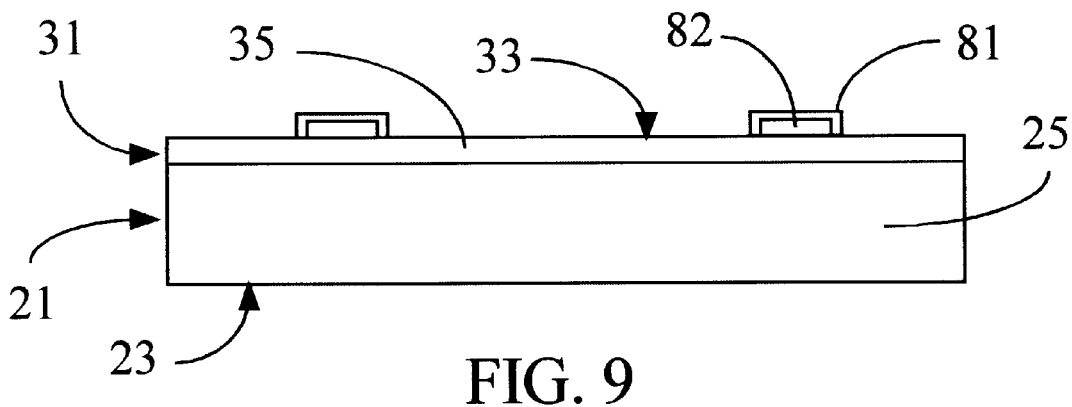
FIG. 9 shows the open end of the first embodiment hinge display female member tunnels with the hinge display female member integral to the display housing.

The basic version of the first embodiment can only be used with computers that have a flat area on the input housing upper side 22 between the input device 28 and the input housing back side 25 as shown in FIG. 1. FIGS. 8 and 9 show an alternative construction of the first embodiment wherein the hinge input unitary member 41 is integral to, or built into, the input housing back side 25. This alternative construction can be used with computers that do not have an open flat area on the input housing upper side 22 between the input device 28 and the input housing back side 25. FIG. 8 is a side view of the alternative construction. FIG. 9 is a view of the alternative construction from the display housing lower side 35. Building the hinge members into the housing can reduce the cost and weight of the hinge system for new computers.

Figure 10:
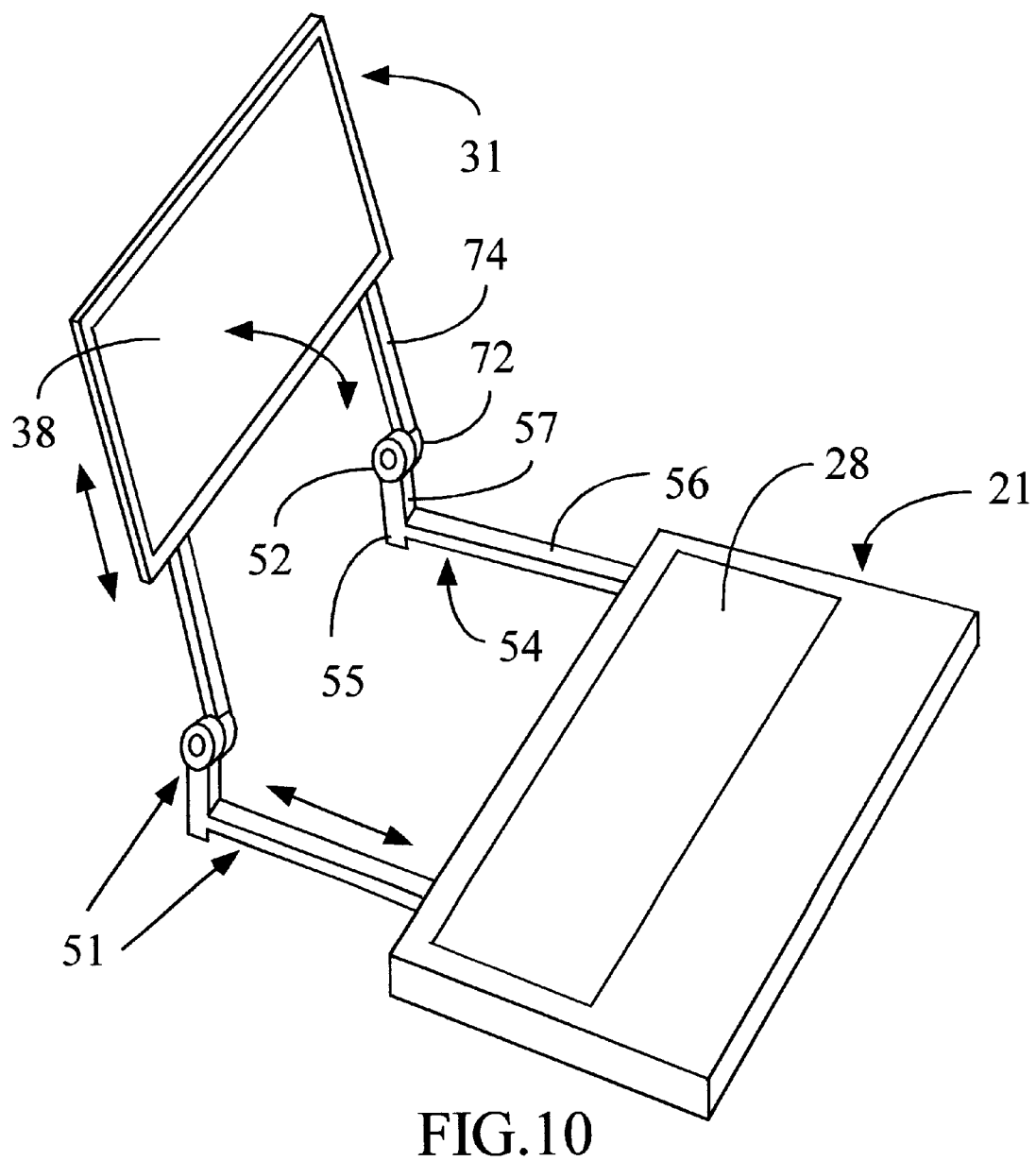
FIG. 10 shows a perspective view of the second embodiment.

FIG. 10 is a perspective view of the second embodiment. The second embodiment comprises a hinge input male member 51, a hinge input female member 61, a hinge display male member 71, and a hinge display female member 81. The hinge input female member 61 attaches to the input housing lower side 23. The hinge input male member 51, comprises an input male member pivot 52, and an input male member rod 54.

Figure 11:
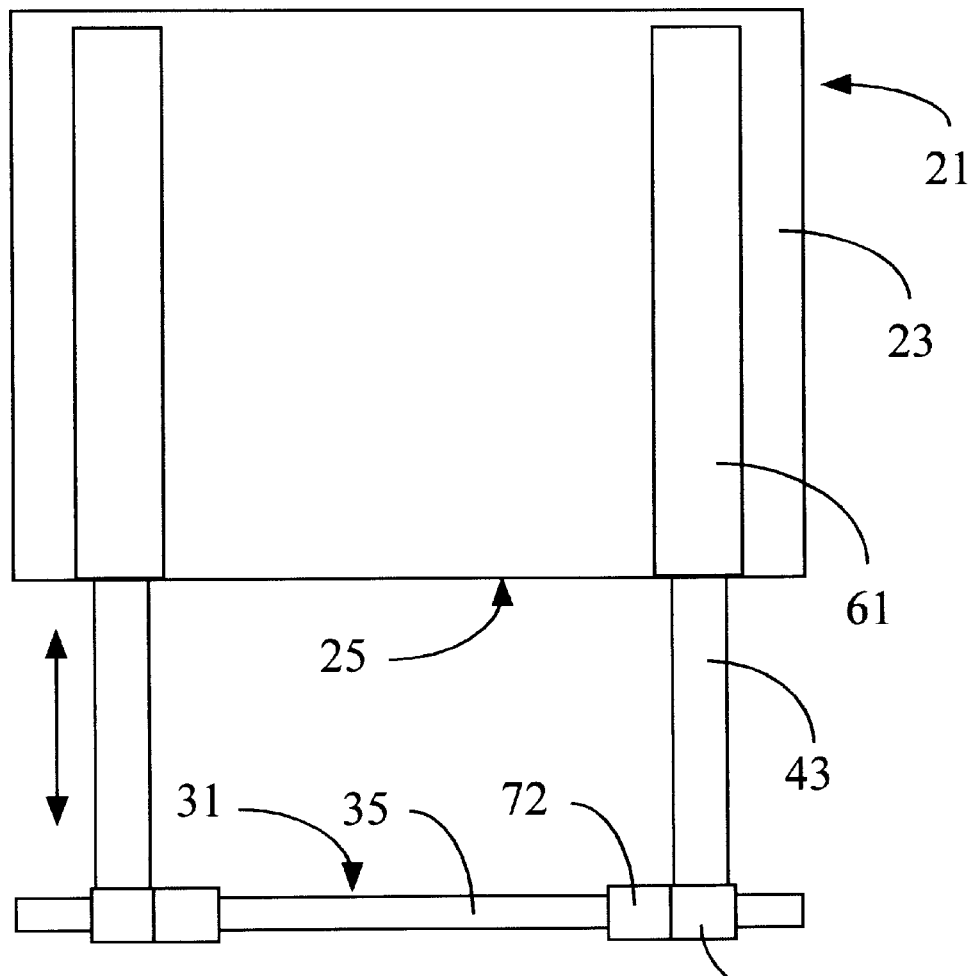
FIG. 11 shows a view of the second embodiment towards the lower side of the input housing.
Figure 12:
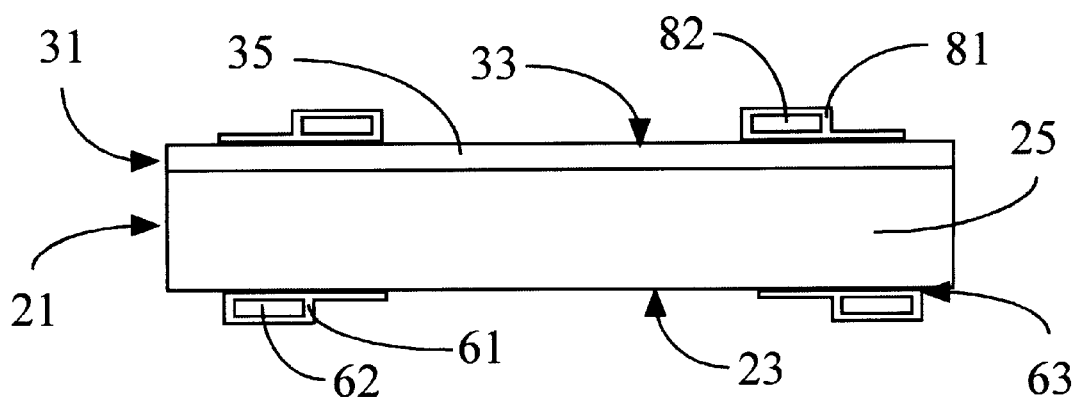
FIG. 12 shows the open end of display female tunnels and input female tunnels of the second embodiment.
Figure 13:
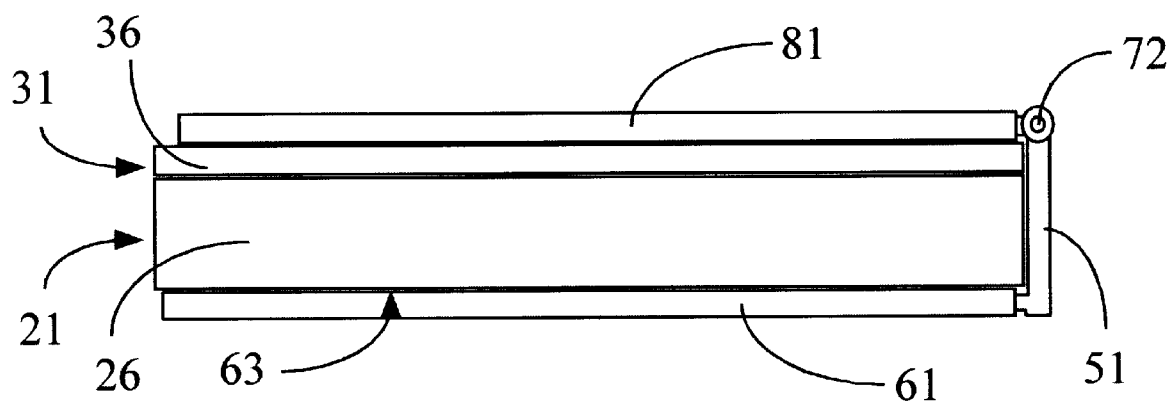
FIG. 13 shows a view of the second embodiment towards the right side of the input and display housings with the display housing stored against the input housing.

FIG. 11 is a view of the second embodiment towards the input housing lower side 23 with the display housing 31 rotated up and extended horizontally away from to the input housing 21. FIG. 12 is a view of the second embodiment towards the input housing back side 25 with the display housing 31 stored against the input housing 21. FIG. 13 is a view of the second embodiment towards the left side of the input housing 21 with the display housing 31 stored against the input housing 21.

The hinge display female member 81 of the second embodiment is essentially the same as the hinge display female member 81 of the first embodiment. The hinge display female member 81, is located on the display housing back side 33 towards the display housing lower side 35. The hinge display female member 81 is attached to the display housing back side 33 by the display female member mating surface 83. Adhesive attaches the display female member mating surface 85 of the hinge display female member 81 to the display housing back side 33. The display female member tunnel 82 receives the display male member rod 74. The hinge display female member 81 can be integrated into the display housing 31 as shown in FIG. 9.

The hinge input female member 61 is similar to the hinge display female member 81. The hinge input female member 61, is located on the input housing lower side 23 with the open end of the input female member tunnel 62 towards the input housing back side 25. The hinge input female member 61 is attached to the input housing lower side 23 by the input female member mating surface 63. Adhesive attaches the input female member mating surface 63 of the hinge input female member 61 to the input housing lower side 23. The input female member tunnel 62 telescopically receives the input male member rod 54. The display female member tunnel 82 receives the display male member rod 74. The hinge input female member 61 can be integrated into the input housing 21 in a manner similar to that shown for the hinge display female member 81 in FIG. 9.

The hinge display male member 71 of the second embodiment is essentially the same as the hinge display male member 71 of the first embodiment. The hinge display male member 71 comprises an input male member pivot 72 and an input male member rod 74. The input male member rod 74 telescopically engages inside the input female member tunnel 82. This provides means for the display housing lower side 35 to be elevated relative to the input housing upper side 22.

The hinge input male member 51, comprises an input male member pivot 52 and an input male member rod 54. The input male member pivot 52 of the second embodiment is essentially the same as the display male member pivot 72. The input male member rod 52 is comprised of an input male member rod horizontal leg 56, an input male member rod foot 55, and an input male member rod vertical leg 57.

The input male member rod horizontal leg 56 of the second embodiment is similar to the display male member rod 74 of the first embodiment. The input male member rod horizontal leg 56 telescopically engages inside the input female member tunnel 62. This provides means for the display housing lower side 35 to be extended horizontally relative to the input housing back side 25. The input male member rod foot 55 extends downward from the input male member rod horizontal leg 56. When the input housing 21 is resting on a flat surface such as a desktop, the input male member rod foot 55 also rests on the flat surface. This supports the display housing 31 when it is extended horizontally back from the input housing 21. The input male member rod vertical leg 57 is angled up approximately 90 degrees from the input male member rod horizontal rod 56. The input male member rod vertical leg 57 positions the input male member rod pivot 52 so that the display housing 31 can store flat against the input housing 21.

In the basic version of the second embodiment, a pivot pin 76 on the display male member pivot 72 engages the pivot slot 95 in the input male member pivot 52 as shown in FIG. 1. This provides means for rotating the angle of inclination of the display housing 31 relative to the input housing 21. In an alternate variation of the second embodiment, a pivot bolt 91 is inserted through pivot holes 93 in the input male member pivot 52 and the display male member pivot 72 as shown in FIG. 7. The angle of rotation between the display housing 31 and the input housing 21 is maintained by friction between the display male member pivot 72 and the input male member pivot 52.

Figure 14:
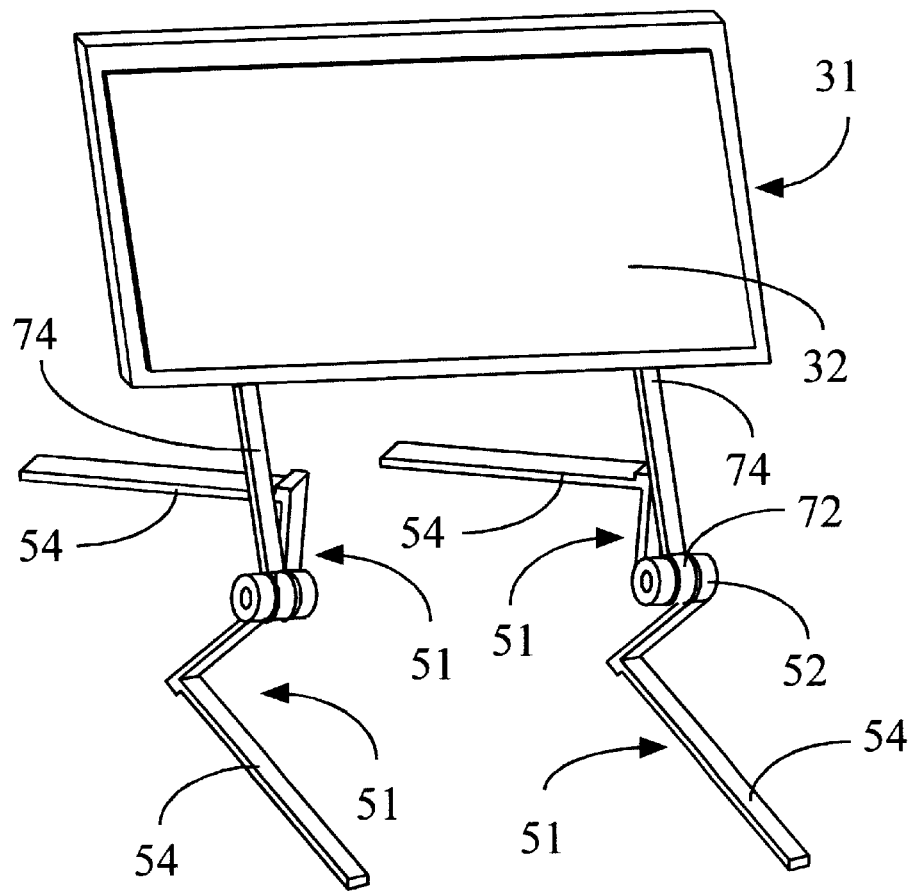
FIG. 14 shows an isometric view of the display housing separated from the input housing and supported by the telescoping pivot hinge.

FIG. 14 shows an optional means for the second embodiment to support the display housing 31 when it is detached from the input housing 21. The hinge system includes 4 hinge input male members 51. The input male members 51 are disengaged from the hinge input female members 61. Two of the hinge input male members 51 are positioned on a flat surface with the input male member horizontal legs 56 positioned approximately horizontal to the flat surface. These two input male member horizontal legs 56 restrain the display housing 31 from the front. The other two hinge input male members 51 are positioned with the input male member horizontal legs 56 angled backward. The ends of these two input male member horizontal legs 56 also rest on the flat surface. These two hinge input male members 51 restrain the display housing 31 from the back.

I claim:

1. A telescoping pivot hinge system for a notebook computer or other device having an input housing and a display housing, said input housing having an upper side comprising a keyboard or other input device, a lower side opposite to the upper side, a front side, a back side, a left side and a right side; said display housing having a front side comprising a visual display, a back side opposite to the front side, an upper side, a lower side, a left side and a right side; said telescoping pivot hinge system comprising:

a hinge display male member;

a hinge display female member;

a hinge input male member;

a hinge input female member;

said hinge display male member comprising a pivot for rotationally attaching to said hinge input male member, and a rod for telescopically inserting into and attaching to said hinge display female member;

said pivot of the hinge display male member having an axis of rotation perpendicular to the angle of inclination between the input housing upper side and the display housing front side;

the hinge display female member comprising an open ended tunnel for receiving and telescopically engaging said rod of the hinge display male member and a display mating surface for mating to the display housing, the hinge display female member rigidly attaches to the display housing with the tunnel approximately perpendicular to the lower side of the display housing, and with the open end of the tunnel towards the lower side of the display housing;

the rod of the hinge display male member telescopically connects inside the tunnel of the hinge display female member;

said hinge input male member comprising a pivot for rotationally attaching to said hinge display male member, and a rod for telescopically inserting into and engaging said hinge input female member;

said pivot of the hinge input male member having an axis of rotation perpendicular to the angle of inclination between the input housing upper side and the display housing front side;

the hinge input female member comprising an open ended tunnel for receiving and telescopically engaging said rod of the hinge input male member and, an input mating surface for mating to the input unit, the hinge input female member rigidly attaches to the input housing with the tunnel approximately perpendicular to the back side of the input housing, and with the open end of the tunnel towards the back side of the input housing;

the rod of the hinge input male member telescopically connects inside the tunnel of the hinge input female member;

the pivot of the hinge input male member rotationally attaches to the pivot of the hinge display male member;

the pivot of the hinge input male member and the pivot of the hinge display male member provide means to vary the angle of inclination between the input housing upper side and the display housing front side;

the rod of the hinge input male member and the tunnel of the hinge input female member provide means to vary the horizontal distance from the front of the display housing to the back of the input housing; and the rod of the hinge display male member and the tunnel of the hinge display female member provide means to vary the vertical elevation from the lower side of the display housing to the upper side of the input housing.

2. The telescoping pivot hinge system of claim 1 wherein the hinge display female member has a second open ended tunnel perpendicular to the first open ended tunnel whereby providing means for the display housing to be attached to the rod of the hinge display male member with the visual display in either a landscape or a portrait orientation.

3. The telescoping pivot hinge system of claim 1 wherein a plurality of hinge display male member rods telescopically insert into and attach to a plurality of hinge display female member tunnels; and a plurality of hinge input male member rods telescopically insert into and attach to a plurality of hinge input female member tunnels.

4. The telescoping pivot hinge system of claim 1 wherein the hinge display female member is attached to the display housing by means of weld, adhesive, composite material, bolts, screws, rivets, or other type of fasteners; and the hinge input female member is attached to the input housing by means of weld, adhesive, composite material, bolts, screws, rivets, or other type of fasteners.

5. The telescoping pivot hinge system of claim 1 wherein the hinge display female member is integral to the display housing; and the input female member is integral to the input housing.

6. The telescoping pivot hinge system of claim 1 wherein the pivot of the hinge input male member and the pivot of the hinge visual display male member are connected by a pivot pin on one member and a receiving pivot slot on the other member.

7. The telescoping pivot hinge system of claim 1 wherein the pivot of the hinge input male member and the pivot of the hinge display male member are connected by a pivot bolt, or other type of fastener, which is inserted through a pivot hole in the pivot of the hinge input male member and a pivot hole in the pivot of the hinge display male member.

8. The telescoping pivot hinge system of claim 1 wherein the rod of the hinge display male member contains a plurality of notches, indents, or holes; the hinge display female member contains a keeper device; and the keeper on the hinge display female member controls the distance that the rod of the hinge display male member is inserted into the tunnel of the hinge display female member; and the rod of the hinge input male member contains a plurality of notches, indents, or holes; the hinge input female member contains a keeper device; and the keeper on the hinge input female member controls the distance that the rod of the hinge input male member is inserted into the tunnel of the hinge input female member.

9. The telescoping pivot hinge system of claim 1 further including a remote display support which engages the hinge display female member to provide means for controlling the angle of inclination and elevation of the display housing front side when the display housing is detached from the input housing.

10. A telescoping pivot hinge system for a notebook computer or other device having an input housing and a display housing, said input housing having an upper side comprising a keyboard or other manual input device, a lower side opposite to the upper side, a front side, a back side, a left side and a right side; said display housing having a front side comprising a visual display, a back side opposite to the front side, an upper side, a lower side, a left side and a right side; said telescoping pivot hinge system comprising:

a hinge display male member;

a hinge display female member;

a hinge unitary input member;

said hinge display male member comprising a pivot for rotationally attaching to said hinge unitary input member, and a rod for telescopically inserting into and engaging to said hinge display female member;

said pivot of the hinge display male member having an axis of rotation perpendicular to the angle of inclination between the input housing upper side and the display housing front side;

the hinge display female member comprising a first open ended tunnel for receiving and telescopically engaging said rod of the hinge display male member, a second open ended tunnel for receiving and telescopically engaging said rod of the hinge display male member, and a display mating surface for mating to the display unit;

said first open ended tunnel of the hinge display female member is parallel to the display housing left side, parallel to the display housing back side, and perpendicular to the display housing lower side, whereby providing means for attaching the hinge display female member to the rod of the hinge display male member with the visual display in a landscape orientation;

said second open ended tunnel of the hinge display female member is parallel to the display housing lower side, parallel to the display housing back side, and perpendicular to the display housing left side, whereby providing means for attaching the hinge display female member to the rod of the hinge display male member with the visual display in a portrait orientation;

the hinge display female member rigidly attaches to the display housing with the first open ended tunnel approximately perpendicular to the lower side of the display housing, and with the open end of the tunnel towards the lower side of the display housing;

the rod of the hinge display male member telescopically connects inside either the first open ended tunnel of the hinge display female member, or the second open ended tunnel of the hinge display female member;

said hinge unitary input member comprising a pivot for rotationally attaching to the pivot of the hinge display male member, and an input mating surface;

the hinge unitary input member rigidly attaches to the input housing with the axis of rotation of the hinge unitary input member pivot perpendicular to the angle of inclination between the input housing upper side and the display housing front side;

the pivot of the hinge input unitary member rotationally attaches to the pivot of the display male member;

the pivot of the hinge input unitary member and the pivot of the display male member provide means to vary the angle of inclination between the input housing upper side and the display housing front side; and the rod of the hinge display male member and the tunnel of the hinge display female member provide means to vary the vertical elevation from the lower side of the display housing to the upper side of the input housing.

11. The telescoping pivot hinge system of claim 10 wherein a plurality of hinge display male member rods telescopically insert into and attach to a plurality of hinge display female member tunnels.

12. The telescoping pivot hinge system of claim 10 wherein the hinge display female member is attached to the display housing by means of weld, adhesive, composite material, bolts, screws, rivets, or other type of fasteners; and the hinge input unitary member is attached to the input housing by means of weld, adhesive, composite material, bolts, screws, rivets, or other type of fasteners.

13. The telescoping pivot hinge system of claim 10 wherein the hinge display female member is integral to the display housing, and the input unitary member is integral to the input housing.

14. The telescoping pivot hinge system of claim 10 wherein the pivot of the hinge unitary input member and the pivot of the hinge display male member are connected by a pivot pin on one said member and a receiving pivot slot on the other said member.

15. The telescoping pivot hinge system of claim 10 wherein the pivot of the hinge unitary input member and the pivot of the hinge display male member are connected by a pivot bolt, or other type of fastener, which is inserted through a pivot hole in the pivot of the hinge unitary input member and a pivot hole in the pivot of the hinge display male member.

16. The telescoping pivot hinge system of claim 10 wherein the rod of the hinge display male member contains a plurality of notches, indents, or holes; the hinge display female member contains a keeper device; and the keeper on the hinge display female member controls the distance that the rod of the hinge display male member is inserted into the tunnel of the hinge display female member.

17. The telescoping pivot hinge system of claim 10 further including a remote display support which engages the hinge display male member to provide means for controlling the angle of inclination and elevation of the display housing front side when the display housing is detached from the input housing.

* * * * *